United States Patent
Bacon

(10) Patent No.: US 6,921,046 B2
(45) Date of Patent: Jul. 26, 2005

(54) CREATING IMBALANCED THRUST IN A CENTER LINE MOUNTED MULTI-ENGINE JET AIRCRAFT CONFIGURATION AND A METHOD OF USING IMBALANCED THRUST

(75) Inventor: Richard J. Bacon, Golden, CO (US)

(73) Assignee: 3X Jet Aircraft Company, Golden, CO (US)

( * ) Notice: Subject to any disclaimer, the term of this patent is extended or adjusted under 35 U.S.C. 154(b) by 96 days.

(21) Appl. No.: 09/912,078

(22) Filed: Jul. 24, 2001

(65) Prior Publication Data

US 2002/0074453 A1 Jun. 20, 2002

Related U.S. Application Data

(60) Provisional application No. 60/220,294, filed on Jul. 24, 2000.

(51) Int. Cl.$^7$ .................................................. B64D 27/20
(52) U.S. Cl. ............................ 244/52; 244/55; 244/58; 244/53 R
(58) Field of Search .......................... 244/52–55, 53 R; D12/319, 339, 340, 342, 333, 334

(56) References Cited

U.S. PATENT DOCUMENTS

| | | | | |
|---|---|---|---|---|
| 2,557,522 A | * | 6/1951 | Vautier | 244/55 |
| 2,978,208 A | * | 4/1961 | Halsmer | 244/53 R |
| D220,981 S | * | 6/1971 | Ehrlich, Jr. | D12/334 |
| D220,982 S | * | 6/1971 | Ehrlich, Jr. | D12/334 |
| 4,711,415 A | * | 12/1987 | Binden | 244/55 |
| 5,480,107 A | * | 1/1996 | Bacon | 244/55 |
| 5,855,340 A | * | 1/1999 | Bacon | 244/53 R |

OTHER PUBLICATIONS

"Flat Rating Concept" http://www.boeing-727.com/Data/Engine/Flat%20Rating.html. 2 Pages Mar. 16, 2003.

R.W. Prouty Consultant, Helicopter Aerodynamics "What Happening", Aviation Today, Jul. 1999 http://www.aviationtoday/com/reports/rotorwing/previous/july99/aerodynamics.htm, 3 Pages.

Andrew Ayers, "The X–Plane Journal" Turbine Engines, C1998, http://member.newguy.com/–flight/xplane/html/turbines.html, 4 Pages.

* cited by examiner

Primary Examiner—Michael J. Carone
Assistant Examiner—Lulit Semunegus
(74) Attorney, Agent, or Firm—Faegre & Benson LLP

(57) ABSTRACT

A centerline mounted overbalanced multiple main jet engine configuration. The multiple jet engines are centerline mounted rather than parallel offset. While each jet engine is a "main" engine, capable of safely operating the aircraft in the event of a failure of the other engines, the engines are overbalanced in the sense that at least one of the main engines has substantially greater thrust than the other main engines. All of the main engines operate at critical periods of flight, but only one or the other of the main engines operates at other periods. The configuration of this invention combines the efficiency and performance of a single engined aircraft with enhanced safety advantages.

21 Claims, No Drawings

CREATING IMBALANCED THRUST IN A CENTER LINE MOUNTED MULTI-ENGINE JET AIRCRAFT CONFIGURATION AND A METHOD OF USING IMBALANCED THRUST

CROSS-REFERENCE TO RELATED PATENT APPLICATIONS

This patent application claims the benefit of U.S. Provisional Application No. 60/220,294, filed on Jul. 24, 2000.

BACKGROUND OF THE INVENTION

1. Field of the Invention

This invention relates generally to multi-engine jet aircraft configurations, and more particularly to a centerline mounted unequal-thrust main engine configuration. The invention has particular utility for use in the business jet industry.

2. Description of the Related Art

This invention is an improvement to the invention described in U.S. Pat. Nos. 5,855,340 and 5,480,107 of Richard J. Bacon, both of which were invented by the inventor of this invention and are commonly owned by the assignee of this invention. Those patents are hereby incorporated by reference herein, and are referred to as the "prior patents."

SUMMARY OF THE INVENTION

This invention creates and uses imbalanced thrust (differential power) in a centerline mounted multi-engine jet aircraft. It includes: (a) a range of engine combinations, (b) a method of achieving or varying a thrust or power differential, (c) a range of operating methods, including sample profiles, (d) a number of particular applications, (e) improved design methods, and a number of other features and advantages, which are described both below and in the attachment attached hereto comprising a cover sheet and pages A-1 through A-8 (the "Attachment"):

(a) A Range of Engine Combinations

Under the terminology of the prior patents, a 3× combination was discussed at some length. But surrounding the 3× range is a range produced by a wide variety of engine combinations. For example, a range of less than 2× to almost 4× (or beyond) may be employed. At the less-than-2× side, by focusing on the "cleaner" aerodynamics of the centerline mounted concept, with less drag than a conventional twin, and other advantages it may be possible to have a thrust equivalent to that of a conventional (2×-powered) twin while using engines of less actual thrust than the twin—hence, a 1.6× (or even lower amount of combined thrust in a two-engine configuration) engine combination in accordance with the instant invention could equal the effective thrust of a conventional twin, and result in a lower initial purchase cost (because of the anticipated reduced cost in engine acquisition corresponding with the reduced thrust of the engines) while preserving the lower operating costs and increased engine-out safety of the centerline mounted concept.

(b) A Method of Achieving or Varying a Thrust Differential in Engines of the Same Size or Different Sizes.

The engine thrust differential may be achieved by various combinations of different engines. It may also be achieved by combinations of the same engines.

One way of achieving a thrust differential from a pair of engines which are the same is by "down-rating" or otherwise reducing an engine from its maximum thrust. It may be possible to purchase two engines of identical maximum thrust potential, but down-rate one of them beneath its maximum thrust. Except for the down-rating, the engines are the same (resulting in common parts and common skills in the maintenance crew). Because of the down-rating, one of the engines (the down-rated one) may be less expensive than the other engine).

Even without down-rating, the benefits of a thrust differential could be achieved in a pair of centerline mounted engines which are entirely identical if one of them is either shutdown (that is, "staged") during one or more flight segments, or is run at a different power setting than the other engine.

(c) A Range of Operating Methods.

By "staging" is meant shutting off one of the engines. As in the prior patents, the aircraft could be staged during taxi. But instead of staging during one or more of the flight segments (take-off, climb, cruise, descent and landing), both engines could be left running. Instead of staging during one or more of the flight segments, a thrust differential could be obtained by setting a pair of engines at different power settings, thereby creating an effective differential in thrust. This creation of differential thrust can be achieved without staging an engine, and it could even be achieved with identical engines. This leads to a wide range of operating profiles/operating methods.

A sample operational profile might be as follows:

|  | Engine (1) | Engine (2) |
|---|---|---|
| Taxi | off | operating |
| Takeoff & climb | operating | operating |
| Cruise & initial descent | operating | reduced power |
| Final descent & landing | operating | operating |
| Taxi | off | operating |

Where the paired engines are of different size, engine (1) in the table above could be the larger of the two, and engine (2) in the table above could be the smaller of the two. By turning off the larger engine on taxi, and reducing the power of the smaller engine while in cruise and initial descent, operating costs are reduced.

This invention is not limited to the profile described in the table, but it should be understood that there is a large range of profiles. The concept of this invention permits the foregoing operational profile to be modified in every category to achieve whatever result is desired. For example, engines 1 & 2 could be the same size; the engine off on taxi could be engine 2; the engine reduced during cruise could be engine 1 (or both engines might be reduced on cruise); the reduction of power in one or both of the engines might be during cruise only, during cruise and initial descent, during final descent, or at any other time. A key concept is that the centerline thrust characteristics of a pair of main engines creates the room for developing unequal applications of thrust in order to achieve whatever level of higher performance (both engines operating), economy (one engine off, or one or both engines on reduced power), safety (both engines operating, though perhaps with one at reduced power—in addition to the inherent safety margin already provided in an engine-out emergency by a pair of engines having symmetrical, centerline thrust) or other advantage desired. Indeed, there are advantages to be gained even if the only staging or reduction in power occurs during taxi.

See also, examples 1–3 at pp. A-2 to A-4 of the Attachment.

(d) Particular Applications.

This method can be used with any number of products, and may be adapted to a wide range of applications. Among the specific products appropriate for this concept are:

- a 19 passenger commuter (see attachment, p. A-7). It should be noted that the design of this product is intended to bridge the gap that presently exists between conventional turbo-prop aircraft in this category and a jet engine implementation.
- a utility jet (see attachment, p. A-7). It should be noted that the design of this product is intended to bridge the gap that presently exists between conventional turbo-prop aircraft in this category and a jet engine implementation.
- a fractional ownership aircraft (see attachment, p. A-6). It should be noted that the prior patents provide for staging, and the instant disclosure contemplates reductions in power in a non-staged profile.
- a relatively small, e.g., about 8,000 lb gross take off weight, or price target in the range of about $1.0 to $2.5 million personal/business jet (see attachment, p. A-8). It should be noted that the design of this product is intended to bridge the gap that presently exists between conventional single engine aircraft in this category and a multiple jet engine implementation, as well as the gap between turbo-prop and jet engine implementations.

(e) Design Methods.

As may be readily understood from the forgoing disclosures, this invention permits and encourages a new method of aircraft design. Rather than taking the necessity of identical engines as a given in any paired engine design, the freedom to create numerous combinations of differential thrust conditions (and then further to vary the thrust during operation of the aircraft) allows the designer the flexibility to solve problems and/or to maximize results in a new way. For example, the designer can target a particular product or niche (i.e., the 19 passenger commuter, the utility jet, the fractional ownership market, the small jet, or any other particular product); the designer can target any one or more of the typical criteria (acquisition cost, operational cost, speed, range/loiter, balanced field length, cabin volume, weight); and the designer can create the product which fulfills the need (that is, a concern with balanced field length might drive the size of the smaller engine; a concern with cruise speed might drive the size of the larger engine). Given an existing operating aircraft, the concept of this invention might permit a relatively rapid retrofit to enhance performance. Given a clean slate, the concept of this invention permits the designer rapidly to attain a concept-level design.

Advantages

By not requiring staging, this method can avoid staging issues—that is, issues over whether an engine intentionally shut down during flight can be restarted "cold" when needed (and, therefore, it should not be necessary to obtain regulatory approvals, to obtain certifications or otherwise to satisfy the concern over whether an engine, once shut down during flight can be reliably counted upon to restart when needed). As understood from the foregoing discussion and as illustrated in the foregoing operational table, both engines can be kept running during flight, with one of them on reduced power.

Even without staging during flight, it is anticipated that this method can still reduce operating costs. The applicant has estimated that the staged method of the prior patents might result in about a 30% savings in operating costs. The applicant is estimating that the non-staged method (that is, no staging during flight, but with staging on taxi and reduced power in flight) discussed above can still yield about a 20% savings in operating costs.

The method described above continues to preserve the safety of centerline thrust in an emergency engine-out condition (because of the symmetrical thrust) as compared to the emergency engine-out condition in a conventional twin (with asymmetrical thrust).

What is claimed is:

1. A twin-engine jet aircraft configuration, comprising:
    (a) an airframe having a centerline along its longitudinal axis;
    (b) a first jet engine mounted within a plane vertical to the centerline;
    (c) a second jet engine mounted within said plane vertical to the centerline;
    (d) each of said first and second jet engines having a thrust adequate to takeoff, climb, cruise and land the aircraft at full gross weight without use of the other jet engine;
    (e) one of said first and second jet engines having a maximum thrust greater than the maximum thrust of the other of said first and second jet engines, said thrust differential created by a different power setting on one of two otherwise equally powered jet engines.

2. The twin-engine jet aircraft configuration of claim 1, wherein a combined thrust of said first jet engine and said second jet engine is substantially within the range of two times to four times that of a single conventional twin aircraft engine.

3. A jet aircraft configuration comprising:
    (a) an airframe having a centerline along its longitudinal axis;
    (b) a first jet engine mounted to the airframe and intersected by a plane vertical to the centerline; and
    (c) a second jet engine mounted to the airframe and intersected by the plane vertical to the centerline, the second jet engine having a lesser maximum thrust than the maximum thrust of the first jet engine as a result of limiting the second jet engine's maximum thrust capability, but otherwise being equally powered.

4. The jet aircraft configuration of claim 3, wherein the second jet engine's maximum thrust capability is limited by down-rating the second jet engine.

5. The jet aircraft configuration of claim 3, wherein each of the first jet engine and the second jet engine have a thrust adequate to takeoff, climb, cruise and land the jet aircraft at full gross weight without use of the other jet engine.

6. A jet aircraft configuration comprising:
    (a) an airframe having a centerline along its longitudinal axis;
    (b) a pair of equally powered jet engines mounted to the airframe and intersected by a plane vertical to the centerline to produce centerline thrust; and
    (c) a first jet engine of the pair of equally powered jet engines having a lesser maximum thrust capability than the maximum thrust of the other jet engine of the pair of equally powered jet engines as a result of limiting the first jet engine's maximum thrust capability.

7. The jet aircraft configuration of claim 6, wherein the first jet engine's maximum thrust capability is limited by down-rating the first jet engine.

8. The jet aircraft configuration of claim 6, wherein each of the first jet engine and the second jet engine comprises a main jet engine.

9. The jet aircraft configuration of claim 6, wherein the centerline thrust produced by the pair of equally powered jet engines is symmetrical.

10. A jet aircraft configuration comprising:
(a) an airframe;
(b) an engine means, including two or more equally powered jet engines mounted to the airframe, for producing centerline thrust; and
(c) a means for creating an engine thrust differential between the two or more equally powered jet engines during one or more flight segments in which the two or more equally powered jet engines all remain operating.

11. The jet aircraft configuration of claim 10, wherein the means for creating an engine thrust differential comprises setting the two or more equally powered jet engines to run at different power settings.

12. The jet aircraft configuration of claim 10, wherein the means for creating an engine thrust differential comprises limiting at least one of the two or more equally powered jet engines from its maximum thrust capability.

13. The jet aircraft configuration of claim 12, wherein said limiting is accomplished by down-rating the at least one of the two or more equally powered jet engines.

14. The jet aircraft configuration of claim 10, wherein one of the two or more equally powered jet engines has a maximum thrust greater than the maximum thrust of the other of the two or more equally powered jet engines.

15. The jet aircraft configuration of claim 10, wherein the two or more equally powered jet engines have substantially the same maximum thrust capability.

16. The jet aircraft configuration of claim 10, wherein a combined actual thrust of the two or more equally powered jet engines is substantially within the range of 1.6 times to 4 times that of a single conventional twin aircraft engine.

17. The jet aircraft configuration of claim 16, wherein the combined effective thrust of the two or more equally powered jet engines is greater than or equal to that of the single conventional twin aircraft.

18. A jet aircraft configuration comprising:
(a) an airframe having a centerline along its longitudinal axis;
(b) a first jet engine mounted to the airframe and intersected by a plane vertical to the centerline; and
(c) a second jet engine mounted to the airframe and intersected by the plane vertical to the centerline, the second jet engine being equally powered to the first jet engine but having a lesser or equal thrust capability than the first jet engine as a result of limiting the second jet engine's maximum thrust capability.

19. The jet aircraft configuration of claim 18, wherein the second jet engine's maximum thrust capability is limited by down-rating the second jet engine.

20. A jet aircraft configuration comprising:
(a) an airframe having a centerline along its longitudinal axis;
(b) a pair of jet engines mounted to the airframe and intersected by a plane vertical to the centerline to produce centerline thrust;
(c) each of the jet engines of the pair of jet engines being equally powered but have differing maximum thrust capabilities as a result of limiting the maximum thrust capability of at least one of the jet engines of the pair of jet engines; and
(d) each of the jet engines of the pair of jet engines capable of responding to independent thrust control during one or more flight segments.

21. A twin-engine jet aircraft configuration comprising:
(a) an airframe having a centerline along its longitudinal axis;
(b) a first jet engine mounted to the airframe and intersected by a vertical line orthogonal to the centerline;
(c) a second jet engine mounted to the air frame and intersected by the vertical line;
(d) one of said first and second jet engines having a maximum greater than the maximum thrust of the other of said first and second jet engines, said thrust differential created by a different power setting on one of two otherwise equally powered jet engines.

* * * * *